Dec. 21, 1954     W. W. WYSER     2,697,380
ANAMORPHOSCOPE

Filed Aug. 5, 1950     2 Sheets-Sheet 1

INVENTOR.
WENYON W. WYSER
BY
ATTORNEY.

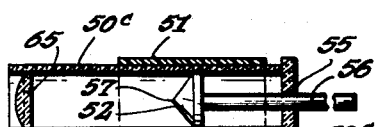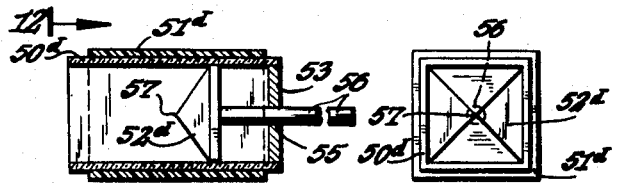
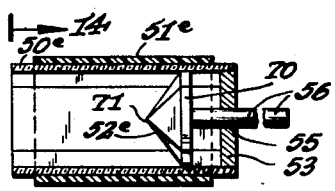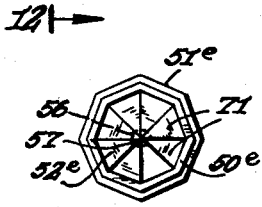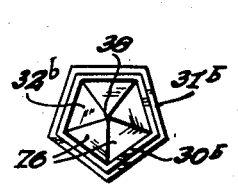
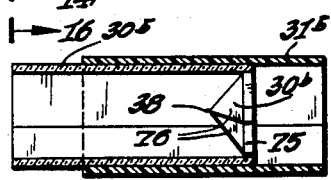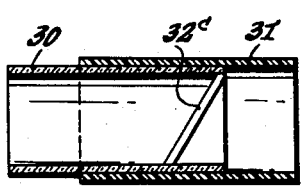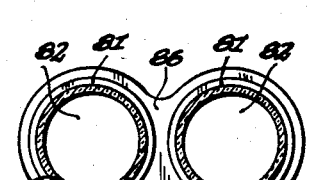
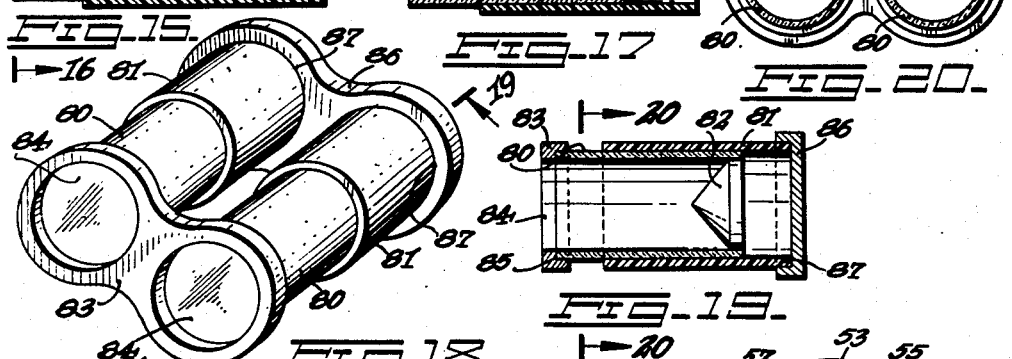
INVENTOR.
WENYON W. WYSER
BY
ATTORNEY.

United States Patent Office

2,697,380
Patented Dec. 21, 1954

2,697,380

ANAMORPHOSCOPE

Wenyon W. Wyser, Stony Point, N. Y.

Application August 5, 1950, Serial No. 177,940

3 Claims. (Cl. 88—76)

This invention relates to new and useful improvements in anamorphoscopes.

More particularly, the present invention proposes the construction of an improved anamorphoscope wherein an anamorphic pattern, interchangeable anamorphic patterns, or a series of anamorphic patterns can be converted into viewable pictures or a series of pictures which can be viewed one after the other.

Another object of the present invention is to provide an anamorphoscope wherein a plurality of anamorphic patterns are arranged in a manner to be converted into a plurality of serially viewable pictures, each of which appears and then disappears on a suitable mirror in a radial wipe fashion.

Still another object of the present invention proposes positioning the viewing mirror within a transparent master tube and upon which there is removably positioned an anamorphic pattern carrier provided with the anamorphic pattern in a manner so that any one pattern carrier can be removed to be interchanged with other carriers having different anamorphic patterns.

A still further object of the present invention proposes providing the master tube with an enlarging lens, which may or may not be focused, in a manner to enlarge the pictures formed by the mirror from the anamorphic patterns.

The invention further proposes the construction of an anamorphoscope in which the master tube and the carrier tube are circular, elliptical or polygonal in cross-section with the mirrors being shaped as cones, elliptical cones, polygonal pyramids or circular cones with polygonal or elliptical bases depending upon the shape of the master tubes within which they are to be fitted.

Still further, the present invention proposes providing the anamorphoscope with sound effects in a manner so that the visual effects are enhanced by related sound effects.

It is a further object of the present invention to provide a stereoscopic anamorphoscope provided with like oriented anamorphic patterns to be viewed simultaneously on a pair of adjacent mirrors as a stereoscopic picture.

Another object of the present invention is to provide an anamorphoscope adapted for converting anamorphic patterns into a plurality of pictures and which, although easily operated, poses a challenge in obtaining the most perfect compositions for the patterns.

It is a further object of the present invention to construct an improved anamorphoscope which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 10 is an axial sectional view of the anamorphoscope in accordance with another modification of the present invention.

Fig. 11 is an axial sectional view of still another modification of the anamorphoscope.

Fig. 12 is an end elevational view looking in the direction of the line 12—12 of Fig. 11.

Fig. 13 is a view similar to Fig. 11, but illustrating a still further modification of the present invention.

Fig. 14 is an end elevational view looking in the direction of the line 14—14 of Fig. 13.

Fig. 15 is a view similar to Fig. 1, but illustrating still another modification of the present invention.

Fig. 16 is an end elevational view looking in the direction of the line 16—16 of Fig. 15.

Fig. 17 is another view similar to Fig. 1, but illustrating a still further modification of the present invention.

Fig. 18 is an isometric view of a stereoscopic anamorphoscope constructed in accordance with the present invention.

Fig. 19 is an axial sectional view taken on the line 19—19 of Fig. 18.

Fig. 20 is a transverse sectional view taken on the line 20—20 of Fig. 19.

Fig. 21 is an axial sectional view of a sound producing anamorphoscope constructed in accordance with the present invention.

Fig. 22 is a view similar to Fig. 21, but illustrating a modification of the sound producing anamorphoscope.

Fig. 23 is an enlarged end elevational view looking in the direction of the line 23—23 of Fig. 22.

The anamorphoscope, in accordance with the preferred embodiment of the present invention illustrated in Figs. 1 to 4, includes a master tube 30, a pattern carrier 31 and a viewing mirror 32.

Figure 1:
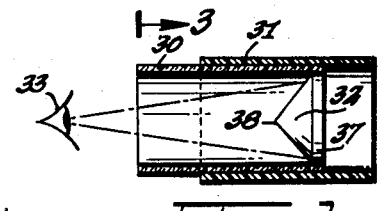
Fig. 1 is an axial sectional view of an anamorphoscope constructed in accordance with a preferred embodiment of the present invention.

The master tube 30 is formed of transparent or translucent material and has an open front end so that it can be looked into as illustrated by the eye 33 on Fig. 1, for viewing a picture which forms on the mirror 32, as will become clear as this specification proceeds. The master tube 30 is made of any suitable material having the properties set forth above such as glass, a synthetic resin or plastic materials or the like.

Figure 3:
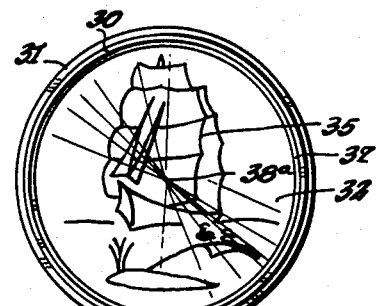
Fig. 3 is an enlarged end view looking in the direction of the line 3—3 on Fig. 1 and illustrating the picture as it appears on the cone-shaped mirror.

The pattern carrier 31 is in the form of a tube of translucent material slidably fitted over the master tube 30 to be axially movable relative to the master tube. The carrier tube 31 is formed of a suitable translucent synthetic plastic material, but may be formed of any other translucent material. From the developed view of the tubular pattern carrier 31, shown in Fig. 4, it will be noted that it is provided with an anamorphic pattern 34 which is to be reflected by the mirror 32 as a picture 35, as shown in Fig. 3. The pattern carrier 31 can be provided with but a single anamorphic pattern 34, as shown, or if desired, the carrier can be provided with a plurality of such patterns arranged one back of the other tandem fashion to be viewed serially on the mirror 32 as the carrier 31 is shifted axially relative to the master tube 30 and the mirror. If a plurality of pictures are provided on the pattern carrier 31, movement of the carrier in one direction or the other will cause the pictures to move onto and off the surface of the mirror 32 in radial wipe fashion. Anamorphic patterns are generally known by those skilled in the art to which the present invention relates and the manner of forming the same will not be entered into in this specification as their formation forms no part of the present invention. The patterns 34 can be applied to the pattern carrier, on either its inner or outer surface, by etching, embossing, with pen and ink or pencil, photographically or in any other known manner.

Figure 2:
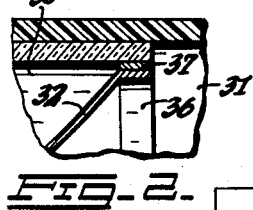
Fig. 2 is an enlarged detailed view of a portion of Fig. 1.

The mirror 32 is conical and has a cylindrical base 36 secured in position across the rear end of the master tube 30 by mucilage 37, as shown in Fig. 2. The apex 38 of the mirror is directed toward the open front end of the tube 30 and that apex is indicated in Fig. 3 by the small cross 38ª, so as to forwardly project the picture 35 formed from the anamorphic pattern 34 carried by the pattern carrier 31.

The mirror 32 can be formed of any desired reflective material such as metal having a highly polished surface, glass having its back surface silvered or any other suitable material capable of forwardly projecting the picture 35. While the mirror is shown as being circular that is by way of illustration only as the mirror and/or its base can be of any desired cross-sectional shape as circular, rectilinear or irregular and the sides of the mirror can be straight, curved—either concave or convex—or irregularly shaped.

Figure 5:
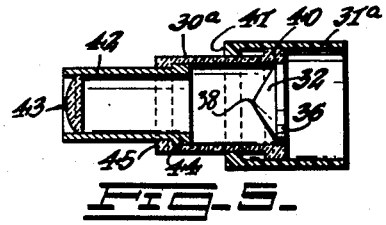
Fig. 5 is an axial sectional view of an anamorphoscope constructed in accordance with a modification of the present invention.

In the modification of the invention shown in Fig. 5, the anamorphoscope is characterized by the fact that the rear end of the master tube 30ª is formed with an outwardly extended flange 40 arranged to contact with an inwardly directed flange 41 formed on the front end of the pattern carrier 31ª. Engagement of the flanges 40 and 41 limits axial rearward movement of the pattern carrier 31ª with relation to the master tube 30ª and the mirror 32.

In addition, there is slidably projected into the open front end of the master tube 30ª, a focusing cylinder 42 having an enlarging lens 43 fixedly mounted across the open front end thereof. Sliding of the focusing cylinder 42 with relation to the master tube 30 permits the position of the lens 43 to be adjusted with relation to the mirror 32 to obtain maximum clarity and enlargement of the picture on the surface of the mirror.

To retain the focusing cylinder 42 against being disengaged from the front end of the master tube 30ª, when the focusing cylinder is pulled forward, the inner or rear end of the focusing cylinder is formed with an outwardly projected flange 44. The open front end of the master tube 30ª is formed with an inwardly projected flange 45 to be contacted by the flange 44 of the focusing cylinder 42 to limit forward movement of the focusing cylinder.

In other respects the form of the invention shown in Fig. 5 is similar to that illustrated in Figs. 1 to 4 and like reference numerals are used to identify like parts.

Figure 7:
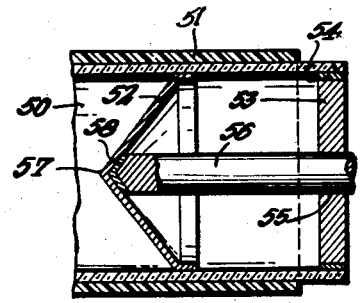
Fig. 7 is an enlarged detailed view of a portion of Fig. 6.
Figure 6:
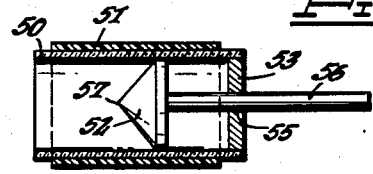
Fig. 6 is an axial sectional view of the anamorphoscope constructed in accordance with a still further modification of the present invention.

The construction of the modification of the invention illustrated in Figs. 6 and 7 of the drawing is comprised of a master tube 50, a pattern carrier 51 and a movable mirror 52.

The master tube 50 is circular in cross-section and is formed of any transparent or translucent material and has an open front end which is to be looked into to see the pictures which form on the mirror. The rear end of the master tube 50 is closed by an end cap 53 secured in position by a layer of mucilage or the like 54, see Fig. 7. The center of the cap 53 is formed with a hole 55.

The pattern carrier 51 is in the form of a tube also circular in cross-section and formed of translucent material. The pattern carrier 51 is provided with an anamorphic pattern the same as or similar to that described in connection with the first form of the invention shown in Figs. 1 to 4. The pattern carrier tube 51 is slidably removably positioned about the master tube 51 to be removed to be interchanged with other carriers having other anamorphic patterns to be converted into viewable pictures by the mirror 52.

The mirror 52 is similar in construction to the mirror 32 of the first form of the invention, except that the mirror 52 is slidably positioned within the master tube 50 to be moved forward and rearward with relation to the master tube and the pattern carrier 51 to have the pictures move onto and off the surface thereof. Movement of the mirror 52 is accomplished through the medium of a rod 56 projected axially into the master tube 50 from the rear end thereof. The forward end of the rod 56 is pointed to agree with interior shape of the apex 57 of the mirror 52, see Fig. 7. A layer of mucilage 58 or the like, attaches the front end of the rod 56 to the interior of the apex 57 of the mirror 52.

The intermediate portion of the rod 56 is freely slidably projected through the hole 55 in the end cap 53 and the rear end thereof is free to be manually gripped to be pushed or pulled for moving the mirror 52 back and forth within the master tube 50.

Figure 8:
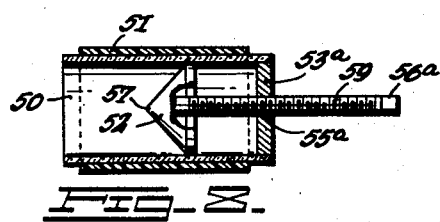
Fig. 8 is a view similar to Fig. 6, but illustrating still another modification of the present invention.

The modification of the invention shown in Fig. 8 is characterized by the fact that the rod 56ª is formed with threads 59 which engaged complementary threads formed on the material of the end cap 53ª defining the hole 55ª. The threads 59 of the rod 56ª and the complementary threads of the end cap 53ª are relatively steep so as to advance the mirror 52 a considerable distance within the master tube 50 for each complete revolution of the rod 56ª. The interengagement of the threads provides a means for evenly and smoothly advancing the mirror 52 within the master tube 50.

In other respects, the modification of the invention shown in Fig. 8 is similar to that illustrated in Figs. 6 and 7 and like reference numerals are used to identify like parts.

Figure 9:
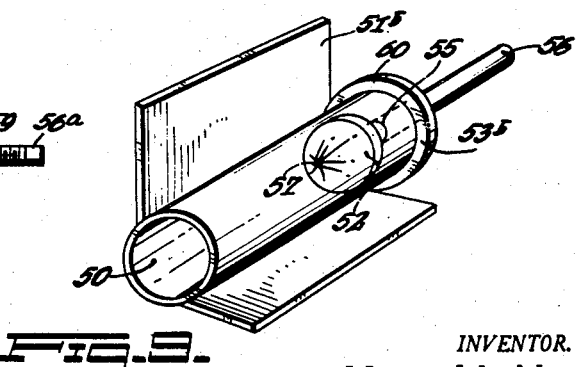
Fig. 9 is an isometric view of an anamorphoscope in accordance with a further modification of the present invention.

In the modification of the invention shown in Fig. 9, the anamorphoscope differs from that shown in Figs. 6 and 7 in the construction of the pattern carrier 51ᵇ. That pattern carrier in 51ᵇ is in the form of a sheet of translucent material having an anamorphic pattern thereon and which is to be wound about the outer periphery of the master tube 50. The pattern carrier 51ᵇ is of a length to be wound once completely about the master tube 50 with its adjacent ends contacting one another.

For guiding the wrapping of the pattern carrier 51ᵇ about the master tube 50, the end cap 53ᵇ has a flange 60 which projects beyond the outer periphery of the rear end of the master tube 50 to be contacted by the rear edge of the pattern carrier. The pattern carrier 51ᵇ can be formed of any flexible translucent material such as paper or one of the synthetic resin or plastic materials.

Otherwise the form of the invention shown in Fig. 9 is similar to that illustrated in Figs. 6 and 7 and like numerals identify like parts.

The modification of the invention illustrated in Fig. 10, is characterized by a master tube 50ᶜ which is formed at its rear end with an integral end cap 53ᶜ through which the rear end of the rod 56 is slidably extended.

The front end of the master tube 50ᶜ is projected a considerable distance beyond the front end of the pattern carrier 51 and has an enlarging lens 65 fixedly mounted across that front end of the master tube. The lens 65 is not adjustable for focusing, but by shifting the entire anamorphoscope axially with relation to the viewing eye the desired focusing and clarity of the picture on the surface of the mirror 52 can be achieved.

In other respects the form of the invention shown in Fig. 10 is similar to that illustrated in Figs. 6 and 7 and like reference numerals are used to identify like parts.

Figs. 11 and 12 illustrate another modification of the form of the invention shown in Figs. 6 and 7 which differs only in the cross-sectional shape of the parts. In this form of the invention, the master tube 50ᵈ and the tubular pattern carrier 51ᵈ are square in cross-section and the mirror 52ᵈ is of pyramidal shape to fit slidably but non-rotatively within the master tube 50ᵈ.

Again, in other respects the form of the invention illustrated in Figs. 11 and 12 is similar to that illustrated in Figs. 6 and 7 and like reference numerals identify like parts.

The modification of the invention shown in Figs. 13 and 14 is characterized by the fact that the parts have a polygonal cross-sectional shape. In this form of the invention, the master tube 50ᵉ and the tubular pattern carrier 51ᵉ are hexagonal cross-section. The mirror 52ᵉ has an octagonal base 70 and the reflecting surface thereof is continued as a plurality of facets 71—one for each of the sides of the octagonal base 70.

In other respects the form of the invention illustrated in Figs. 13 and 14 is also similar to that illustrated in Figs. 6 and 7 and like reference numerals are used to identify like parts.

The modification of the invention illustrated in Figs. 15 and 16 is similar to that illustrated in Figs. 1 to 4 except for the polygonal cross-sectional shape of the parts. The master tube 30ᵇ and the tubular pattern carrier 31ᵇ are pentagonal in cross-section and the mirror 32ᵇ has a pentagonal base 75 fixedly secured in position within the rear end of the master tube 30ᵇ and the reflecting surface of the mirror 32ᵇ is characterized by five facets 76 one for each of the sides of the pentagonal base 75.

In other respects the form of the invention shown in Figs. 15 and 16 is similar to that illustrated in Figs. 1 to 4 and like reference numerals identify like parts.

The particular cross-sectional shapes for the parts of the anamorphoscopes illustrated in Figs. 11 and 12, Figs. 13 and 14 and Figs. 15 and 16 are by way of illustration only as any other polygonal, elliptical or irregular shape can be used without departing from the scope of the present invention.

Fig. 17 illustrates a further modification of the invention shown in Figs. 1 to 4 which differs in the formation of the mirror 32ᶜ. That mirror 32ᶜ is in the form of a flat piece of reflective material which is fixedly mounted at an incline in the rear end of the master tube 30.

In other respects the form of the invention shown in Fig. 17 is similar to that illustrated in Figs. 1 to 4 and like reference numerals identify like parts throughout.

Figs. 18 to 20 illustrate the construction of a stereoscopic anamorphoscope having adjacent viewing pieces each comprised of a master tube 80, a pattern carrier 81 and a mirror 82.

The master tubes 80 are formed of any transparent or translucent material and have their front ends tied together by a member 83. The member 83 is formed with an eye opening 84 in alignment with the front end of each of the master tubes 80 and through which one is to look to view the stereoscopic picture which forms on the mirrors 82. The front ends of the master tubes 80 are secured within shoulder portions 85, see Fig. 19, formed in the back face of the member 83 concentric with the eye openings 84.

Figure 4:
Fig. 4 is a developed view of the carrier tube showing the anamorphic pattern applied to the carrier tube for producing the picture shown in Fig. 3.

The pattern carriers 81 are in the form of tubes of translucent material slidably fitted over the rear ends of the master tubes 80 and those tubular pattern carriers 81 carry like anamorphic patterns which are like or similar to the pattern illustrated in Fig. 4. The rear ends of the tubular pattern carriers 81 are tied together by a member 86. The rear ends of those tubular pattern carriers 81 are suitably secured in position within recesses 87, see Fig. 19, formed in the front face of the member 86 so that the like patterns carried by the pattern carriers will be oriented to be seen as a single stereoscopic picture on the mirrors.

By having the tubular pattern carriers 81 tied together by the member 86, they can be moved as a unit relative to the master tubes 80 and the mirrors 82 so that the pictures will simultaneously move on and off the mirrors 82. Furthermore, one set of pattern carriers 81 can be completely disengaged from the rear ends of the master tubes 80 and replaced by another set having different anamorphic patterns.

The mirrors 82 are formed of any desired reflective material and are of conical shape and are fixedly mounted within the rear ends of the master tubes 80 all as described in connection with the first form of the invention illustrated in Figs. 1 to 4.

The modification of the invention shown in Fig. 21 is characterized by the provision of a sound producing means. Basically, the construction of the anamorphoscope is similar to that illustrated in Figs. 6 and 7 and the sound producing means is mounted within the front end of the master tube 50ᶠ. The sound producing means comprises a whistle body 90 fixedly mounted within the front end of the master tube 50ᶠ and formed with aligned centrally located apertures 91 through which one can look for viewing the pictures which form on the movable mirror 52.

As the mirror 52 is moved axially within the master tube 50ᶠ, in one direction or the other, air will be sucked into the master tube or forced therefrom through the apertures 91 creating an appropriate whistling noise to accompany the pictures being viewed on the mirror 52. If desired, the article can be used as a whistle and louder noises made by rapidly moving the mirror 52 forward and rearward within the master tube 50ᶠ.

In other respects the form of the invention shown in Fig. 21 is similar to that illustrated in Figs. 6 and 7 and similar reference numerals are used for like parts.

In the modification of the invention illustrated in Figs. 22 and 23, the construction of the anamorphoscope is again similar to that illustrated in Figs. 6 and 7, but there is illustrated another form of sound producing means.

Mounted along the bottom of the master tube 50ᵍ there is an elongated sound tape 95 which is secured to the inside of the master tube with its length extended parallel to the longitudinal axis of that tube. Mounted on the movable mirror 52ᵍ there is a rearwardly and downwardly inclined stylus or needle 96 which contacts the sound groove of the sound tape 95 to pick up the sound carried by the sound tape. The mirror 52ᵍ functions as a diaphragm for converting vibrations of the stylus 96 into audible sounds which are further amplified within the master tube 50ᵍ before discharging from the open front end thereof.

From Fig. 23 it will be noted that the mirror 52ᵍ is formed at its bottom with a notch 97 which extends about the sound tape 95 and which retains the mirror 52ᵍ from turning within the master tube 50ᵍ and thereby retains the stylus or needle 96 in proper engagement with the sound tape 95.

For example, the entire anamorphoscope, shown in Figs. 22 and 23, can be constructed in the form of a birthday greeting card and the pattern carrier 51 can be provided with a pattern which will result in a birthday greeting on the mirror 52ᵍ and the sound tape 95 can be inscribed to audibly say "Happy Birthday" as the stylus 96 moves thereacross. The anamorphoscope can be made up with suitable greetings for Christmas, Easter, Thanksgiving and other holidays.

In other respects the form of the invention illustrated in Figs. 22 and 23 is similar to that illustrated in Figs. 6 and 7 and like reference numerals identify like parts.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An anamorphoscope comprising a transparent master tube having an open front end, a pattern carrier engaged about said tube, an anamorphic pattern on said carrier, and a mirror within said tube remote from said open front end for producing a viewable picture from said pattern, said pattern carrier being translucent and in the form of a tube slidably removably concentrically engaged about said master tube, said mirror being cone-shaped and fixedly mounted across the rear end of said master tube which is circular in cross-section.

2. An anamorphoscope comprising a transparent master tube having an open front end, a translucent pattern carrier engaged slidably and concentrically about said tube, an anamorphic pattern on said carrier, and a cone shaped mirror within said tube remote from said open front end for producing a viewable picture from said pattern, a focusing cylinder slidably positioned in the front end of said master tube, and a lens mounted across the front end of said focusing cylinder.

3. The combination of claim 2 wherein said pattern carrier includes a flange at the front end thereof and said master tube includes a flange at the rear end, said flanges engaging to provide stop means limiting the sliding movement between the pattern carrier and the master tube.

References Cited in the file of this patent

UNITED STATES PATENTS

| Number | Name | Date |
|---|---|---|
| 243,537 | Farr | June 28, 1881 |
| 697,738 | Miller | Apr. 15, 1902 |
| 888,236 | Hattu | May 19, 1908 |
| 1,157,154 | De Falco | Oct. 19, 1915 |
| 1,957,043 | Harlow | May 1, 1934 |
| 2,014,527 | Harlow | Sept. 17, 1935 |
| 2,126,930 | Snyder | Aug. 16, 1938 |
| 2,244,235 | Ayres | June 3, 1941 |

FOREIGN PATENTS

| Number | Country | Date |
|---|---|---|
| 310,111 | France | June 17, 1902 |
| 329,523 | Germany | Nov. 24, 1920 |
| 704,471 | France | Feb. 23, 1931 |
| 581,650 | Great Britain | Oct. 21, 1946 |